United States Patent [19]

Murray

[11] Patent Number: 4,676,198
[45] Date of Patent: Jun. 30, 1987

[54] METHOD FOR SAFE TRANSPORT OF ANIMALS IN VEHICLES

[76] Inventor: Gary D. Murray, 4650 Sierra Madre #714, Reno, Nev. 89502

[21] Appl. No.: 726,139

[22] Filed: Apr. 23, 1985

[51] Int. Cl.$^4$ .................. A62B 35/00; A01K 1/06
[52] U.S. Cl. ........................... 119/96; 119/109; 280/801
[58] Field of Search ............... 280/748, 801; 119/96, 119/109

[56] References Cited

U.S. PATENT DOCUMENTS

| | | | |
|---|---|---|---|
| D. 110,625 | 7/1938 | Nesbitt | 119/96 |
| 2,826,172 | 3/1958 | Buckle | 119/96 |
| 2,909,154 | 10/1959 | Thomas | 119/96 |
| 3,310,034 | 3/1967 | Dishart | 119/96 |
| 3,428,029 | 2/1969 | Klickstein | 119/96 |
| 4,252,084 | 2/1981 | Willow | 119/96 |

FOREIGN PATENT DOCUMENTS 0065509 11/1982 European Pat. Off. ............ 96/

Primary Examiner—John J. Love
Assistant Examiner—Karin L. Ferriter
Attorney, Agent, or Firm—Flehr, Hohbach, Test, Albritton & Herbert

[57] ABSTRACT

This invention is a method and apparatus for insuring safety of dogs and other animals in automotive vehicles and the like wherein the method comprises equipping the animal with a specially designed harness which can be used as a leash harness with a built in leash, and wherein the method provides for appropriate loops on the harness to be held by automotive seat belts of various types or by a special belt fastened to the rear of pickup trucks. The harness encompasses the animal's body in at least two places between the legs and has an opening for the head with a chest strap provided. The leash is joined to the portions which surround the animal's body and can be adjusted so as to provide and form safety loops to be held by an ordinary seat belt or the like.

1 Claim, 9 Drawing Figures

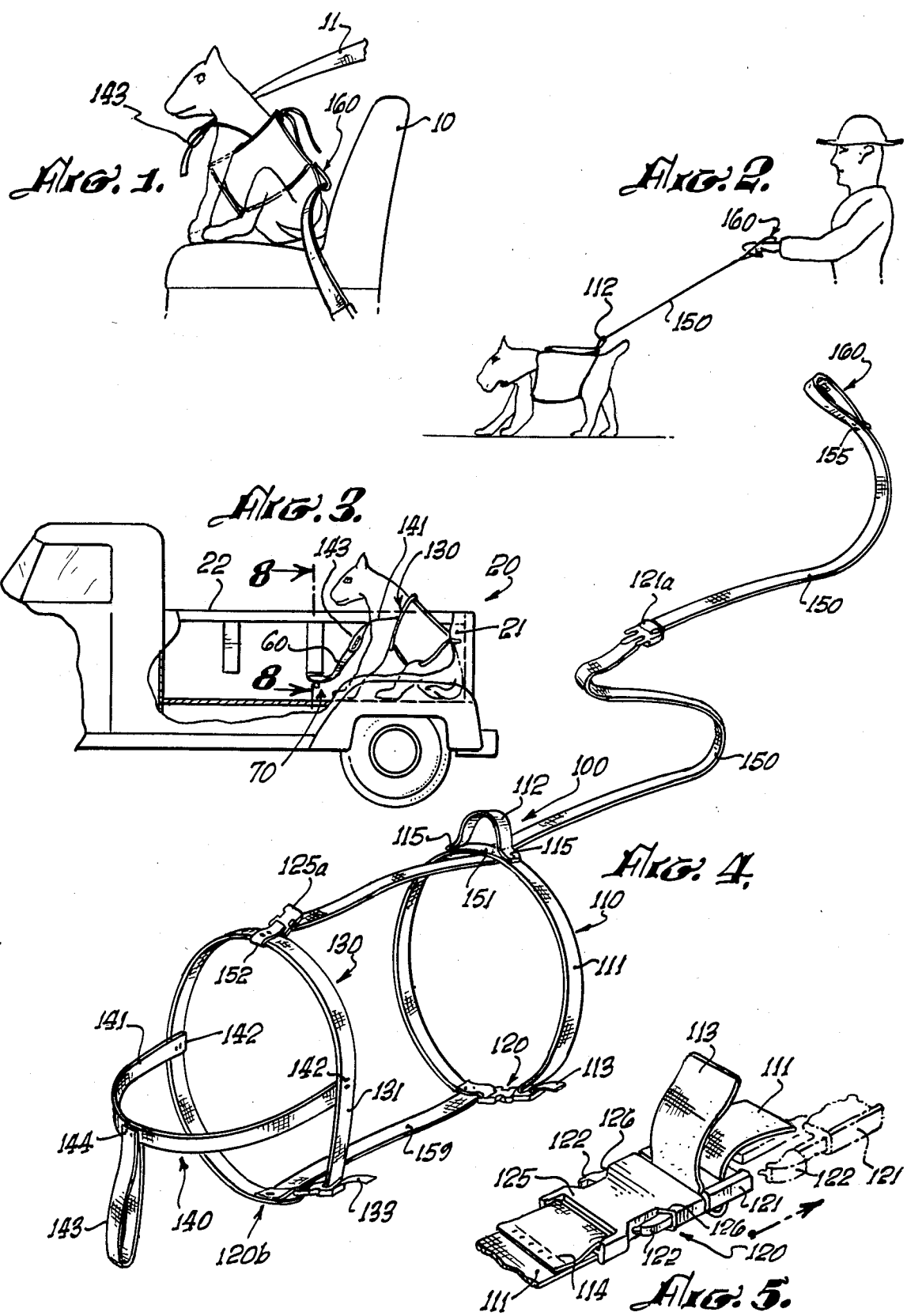

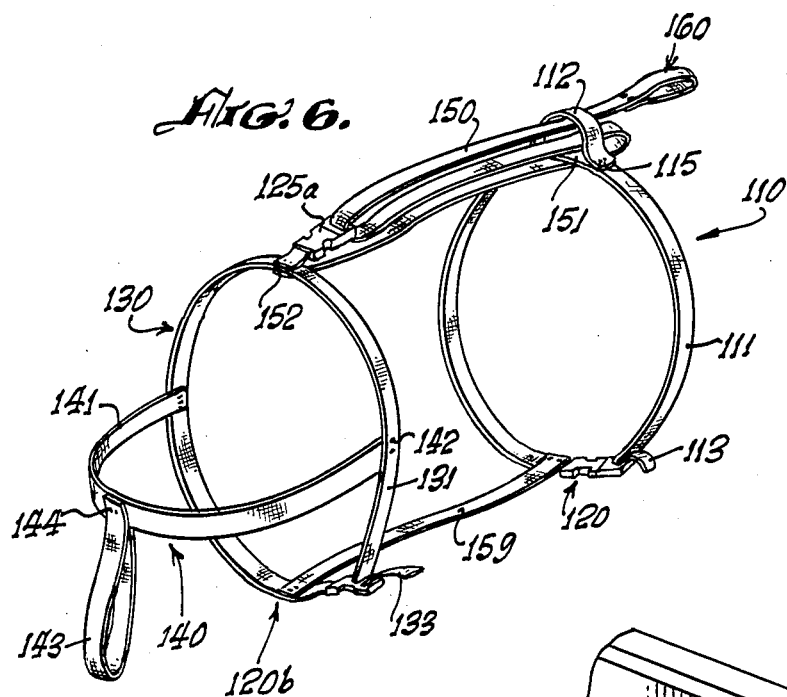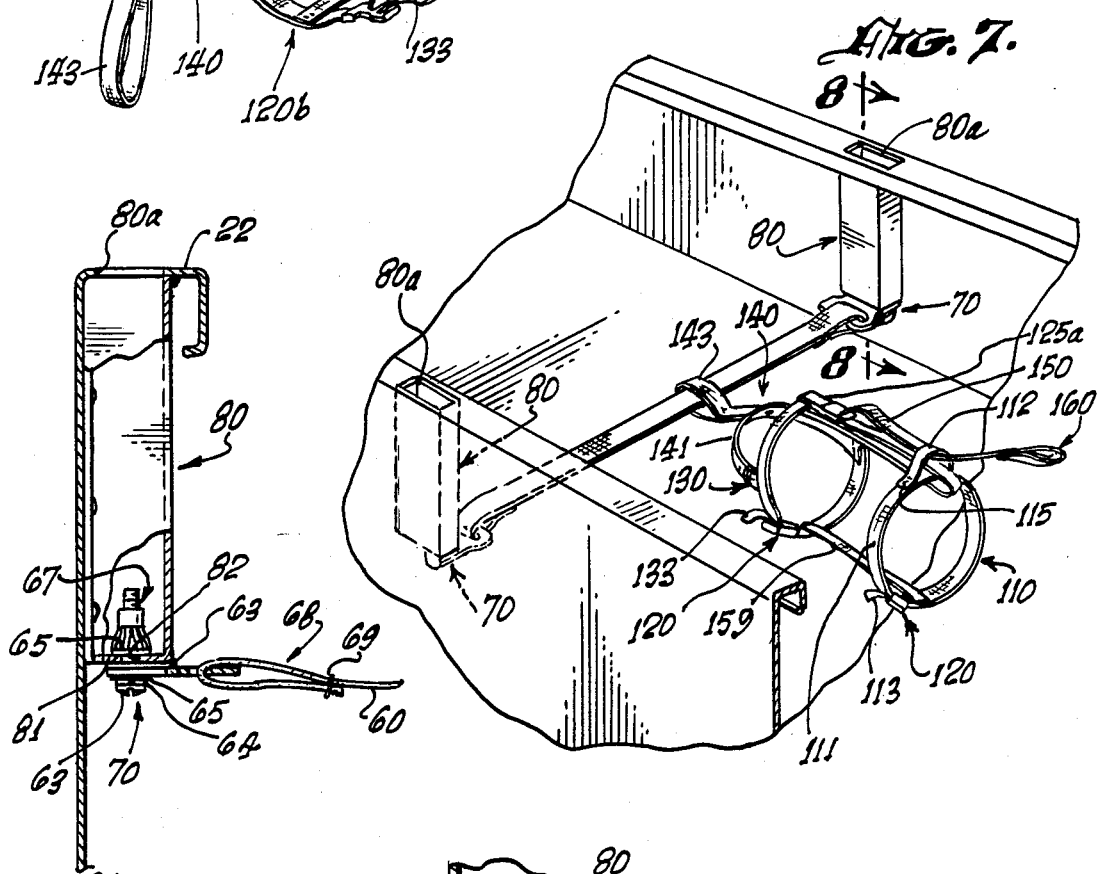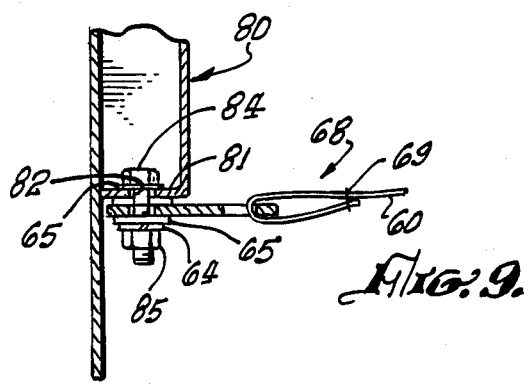

METHOD FOR SAFE TRANSPORT OF ANIMALS IN VEHICLES

CROSS REFERENCE TO RELATED PATENT APPLICATIONS

There are no patent applications filed by me related to the within application.

BACKGROUND OF THE INVENTION

I. Field of the Invention

This invention is in the general field of automotive safety restraint methods and devices. The invention is more particularly directed to safety restraint methods and devices for animals when being transported in automotive vehicles. The invention even more particularly relates to a harness method and apparatus incorporating means to be held by various types of automotive seat belts as well as a special form of belt for installation in the rear or "bed" portion of pickup trucks.

II. Description of the Prior Art

There have been some attempts to provide restraints of one type or another for use in automotive vehicles to restrain the activity of dogs, cats, and other animals when carried in an automotive vehicle either on a seat or in the rear of pickup trucks. The devices heretofore attempted have normally consisted of leashes with hooks or the like which can be hooked to a portion of the vehicle, particularly to the bed of a pickup truck.

The devices previously used are, if anything, more dangerous than having no restraint, since a dog or other animal wearing one could be thrown from the vehicle and dragged or could suffer other physical injury by reason of the nature of these devices.

The present invention involves a harness with loops under the chest and formed to the rear over the back of the animal in such manner that these loops can be held properly by conventional seat belts in automobiles or by a special strap mounted in the beds of pickup trucks. Up to this time there has been no such device that has these special loops of webbing or the like which can be engaged by ordinary seat belts in such manner as to hold an animal in a comfortable seated or reclining position. In this respect there is no prior art.

SUMMARY OF THE INVENTION

Many persons take dogs, cats and other animals with them as passengers in automobiles or pickup trucks. In some instances the animal is allowed to roam free in the vehicle and in some instances the animal may be restrained in the vehicle by a leash or the like. In either event, the animal can suffer great injury by reason of jumping out of the vehicle, being thrown about in sudden stops or in accidents, or by reason of the choking effect some such devices have.

I have studied this problem extensively and have finally concluded that the only satisfactorily safe method of restraining an animal is essentially the same as restraining a human being in that the animal should be restrained by the seat belts with which most vehicles are now equipped. However, because of the configuration of the animals body and other factors creating a difference between animals and human beings, it is not possible to use conventional seat belts with any great facility.

I have now conceived and developed an interesting and effective special harness arrangement for animals, which is adjustable to the size of different animals and which effectively restrains the animals around their body adjacent, and between the legs. There is also provided a chest restraint with a loop suitable to be engaged by the chest-shoulder portion of certain seat belts installed in automotive vehicles for human use. Additionally, a leash is formed integrally with the harness which leash extends over the back of the harness and may be used as a direct leash or may be returned through a portion of the harness to provide a rear seat belt loop which can be held easily and satisfactorily by a regular seat belt, or a portion of a two part seat belt.

Additionally, I have provided a special strap for installation in pickup trucks which is adapted so as to restrain the animal by a cooperative relationship with the elements heretofore described.

I have accomplished all of this by the use of webbing or the like and uniquely positioned seat belt loop areas.

It is an object of this invention to provide a method and apparatus for animal restraint for use by animals when traveling as passengers in automotive vehicles.

Another object of this invention is to provide such a method and apparatus as has been described for the restraint of animals doing vehicular travel which can become a leash as desired for walking the animal outside of the vehicle.

Still another object is to provide a method and apparatus as described wherein an adjustment is possible to adjust to any conventional seat belt.

The foregoing and other objects and advantages of this invention will become clear to those skilled in the art upon reading a description of a preferred embodiment which follows in conjunction with a review of the appended drawings.

BRIEF DESCRIPTION OF THE DRAWINGS

FIG. 1 is a schematic elevational view of a dog being restrained by the method and apparatus of this invention;

FIG. 2 is a schematic elevational view of a dog being held by a portion of this apparatus while walking close to or to or from the vehicle in which it will be traveling;

FIG. 3 is a schematic side view partially broken away of a pickup truck with a dog being restrained by the method and apparatus of this invention;

FIG. 4 is a perspective of a preferred embodiment of an apparatus suitable to practice the method of this invention;

FIG. 5 is a more detailed view of one of the snaps used as connectors and adjusting devices in a preferred apparatus to practice the method of this invention;

FIG. 6 is a view of the apparatus of FIG. 4 wherein the leash portion has been placed into the configuration wherein it is used in a vehicle;

FIG. 7 is a schematic perspective of the apparatus of FIG. 6 in reduced scale in place in the rear of an automotive pickup vehicle;

FIG. 8 shows the method of attaching the belt utilized in FIG. 7; and

FIG. 9 shows an alternate means of fastening the belt in FIG. 7.

DESCRIPTION OF A PREFERRED EMBODIMENT

Fundamentally in this particular method and apparatus all of the Figures should be viewed together. The only Figure which shows an alternate to the overall method and apparatus is FIG. 9.

References will be made to the various Figures from time to time, but these references are merely for emphasizing a particular feature.

Commencing with FIG. 4 the harness, generally 100 is shown in some detail. The harness consists of two encircling bands generally 110 and 130 which encompass the body of a dog, cat or other animal immediately to the rear of the front feet and immediately to front of the rear feet.

Additionally, a harness member generally 140 crosses the chest of the animal beneath the head.

A leash like member 150 is connected between the two members 110 and 130 and extends a distance beyond.

There are a number of other elements and all of the elements will now be described in sufficient detail so that one skilled in the art will understand completely the construction of this preferred embodiment.

FIG. 4 illustrates every element of the preferred embodiment. It will be observed that the band 110 which encircles the body of the animal and the band 130 which encircles the body of the animal are made up of preferably webbing or similar material 111 and 131. The chest piece 140 is also preferably of webbing 141. Also, the lead or leash item 150 and the chest piece loop 143 should also be of webbing or similar material. The member 159 connects between the member 110 and the member 130 and is riveted or otherwise fastened appropriately as will be understood by those skilled in the art so as to hold its position. There will be a disconnecting snap arrangement 120, and 120b, by which the apparatus may be removed from the animal. Likewise, there will be adjustments at 113 and 133 so that the proper fit can be arranged.

The connecting arrangements used herein are commonly known and need little explanation. That explanation will come in connection with FIG. 5 which will be discussed in detail later.

A loop 112 of webbing or the like is provided and riveted or otherwise fastened by appropriate members 115 to the webbing 111. The member 125a is riveted or otherwise appropriately fastened at 152 to the member 130.

The loop member 143 is riveted or fastened by some other (it could be removeable) means 144 to the strap 141. Strap 141 is preferably permanently attached at 142 to two sides of the webbing 131.

The leash arrangement 150 is attached at 151 and 152 to members 110 and 130 respectively so it passes over the back of the animal. The loop 112 of webbing or the like is riveted or otherwise permanently attached, preferably, at 115 to the webbing 111. The handle 160 is of ordinary construction being looped around and fastened at 155.

A portion of the connecting member 121a is fastened permanently to the leash arrangement 150 at the approximate location shown. Thus, it can come under the loop 112 and fasten into its connecting element 125a. Connecting element 125a is permanently attached at 152 to member 130.

120b illustrates a connection which can be disconnected if need be, but it is a snap connection of the general configuration and construction of the snap arrangement illustrated in FIG. 5.

The strap 131 is adjustable removing its end 133 through appropriate arrangements similar to 113 and its associated elements as illustrated in detail in FIG. 5 and which will be commented upon later.

The connecting elements 120, 120b, and 121–125a complete the adjusting elements as used.

While specific reference has been made to FIG. 4, it must be understood these same references numerals are used and should be examined in connection with all of the other Figures.

Examining particularly FIG. 6 it will be seen that the leash arrangement 150 having its handle 160 is capable of being shortened by interconnection of the elements 121a and 125a to make a complete connection with two loops being loop 112 and the loop 160 being unaffected except for distance. The loop 160 in the condition shown in FIG. 6 is capable of surrounding, or being encompassed by a restraining belt or the like. Now, attention should be given to FIG. 1 showing an animal wherein the seat belt is being passed through the loop 160 and fastened and thus provides a constraint and restraint of the animal within the seat generally 10.

Additionally, the shoulder portion of a seat belt may be passed through the loop 143 for the restraint similar to the restraint of a human except that the rear loop will be used with the lap belt.

The connecting arrangement of FIG. 5 is not terribly important since there are many connecting arrangements known to those skilled in the art. However in this case we have used a device which consists of a pair of mating elements wherein spring loaded or otherwise spring activated elements 122 engage at 126 with a mating element generally 125. This element is connected to the belts 111 and all of the other belts as recited in the application.

Any other type of breaking, releasing or separable connector would be suitable for the element generally 120. The belt 111 slips through a customary adjusting arrangement at 121 and thus the size of the animal can be accommodated.

It will be clear from the illustration of FIG. 2 that an animal may be led, restrained and guided by this device. Preferably the animal will be equipped with the device and then led into the vehicle where any necessary adjustments including the adjustment indicated in FIG. 6 will be made.

Turning particular attention to FIG. 7, a belt has been stretched across the back of a pickup truck. At this point, the belt is shown passing through the loop 143. This makes it preferred that the loop 144 be either detachably or openably mounted upon the chest strap 141. This is no problem and it is known to those skilled in the art. Also, a zipper, a snap, or the like can be used to engage the loop 160 or to disengage from it.

Virtually all American made trucks and many foreign made trucks have approximately in the center of the rail on each side of the back a stake well as is illustrated in FIG. 8. This is indicated by the general numeral 80.

Every stake well has a drain hole in the bottom thereof.

In FIG. 8 is shown a molly bolt type arrangement being inserted into that hole and being closed. The details of the molly bolt are well known to those skilled in the art and need not be explained otherwise. Alternately, a bolt may be dropped down into the stake well and a nut 85 may be attached thereto with lock washers 65 and 64 or the like to hold the same in place.

While the embodiments of this invention shown and described are fully capable of achieving the objects and advantages desired it is to be understood there are for purposes of illustration only and not for purposes of limitation.

I claim:

1. Animal restraint means comprising in cooperative relationship: a generally "U" shaped means suitable to engage the chest area of an animal; a first closed loop depending from and attached to said "U" shaped means at its center; first adjustable animal body encompassing means attached to the two ends of said "U" shaped means in such manner that when placed on a four legged animal, said "U" shaped means will bear across the animal's chest and the first adjustable animal body encompassing means will be around the animal's body adjacent the rear of the animal's front legs; second adjustable animal body encompassing means suitable to encompass the animal's body adjacent the front of the animal's rear legs; joinder means joining said first and second animal body encompassing means at a spaced distance from each other and so disposed to run along the underside of the animal; elongated leash means attached at a first end to said first adjustable animal body encompassing means at a position adjacent to the upper side of the animal's body when placed upon the animal, attached a point intermediate its ends to the second adjustable animal body encompassing means so that it passes along the upper side of the animal's body; second loop means attached to a second end of said leash means; third loop means attached to the second adjustable animal body encompassing means adjacent the position it is attached to the leash means; and leash shortening means comprising a releasable connector having one connector element secured to a portion of the leash means intermediate the second end and the attachment to the second adjustable animal body encompassing means and a mating connector element secured to said restraint means substantially at the attachment of the first end of the leash means to the first animal body encompassing means said leash shortening means cooperable with said leash means and said third loop means to allow said leash means to be shortened by having a portion of said leash means to become folded back on itself and be held at a position intermediate its second end and the position to which it is attached to the second adjustable animal body encompassing means.

* * * * *